Patented June 21, 1938

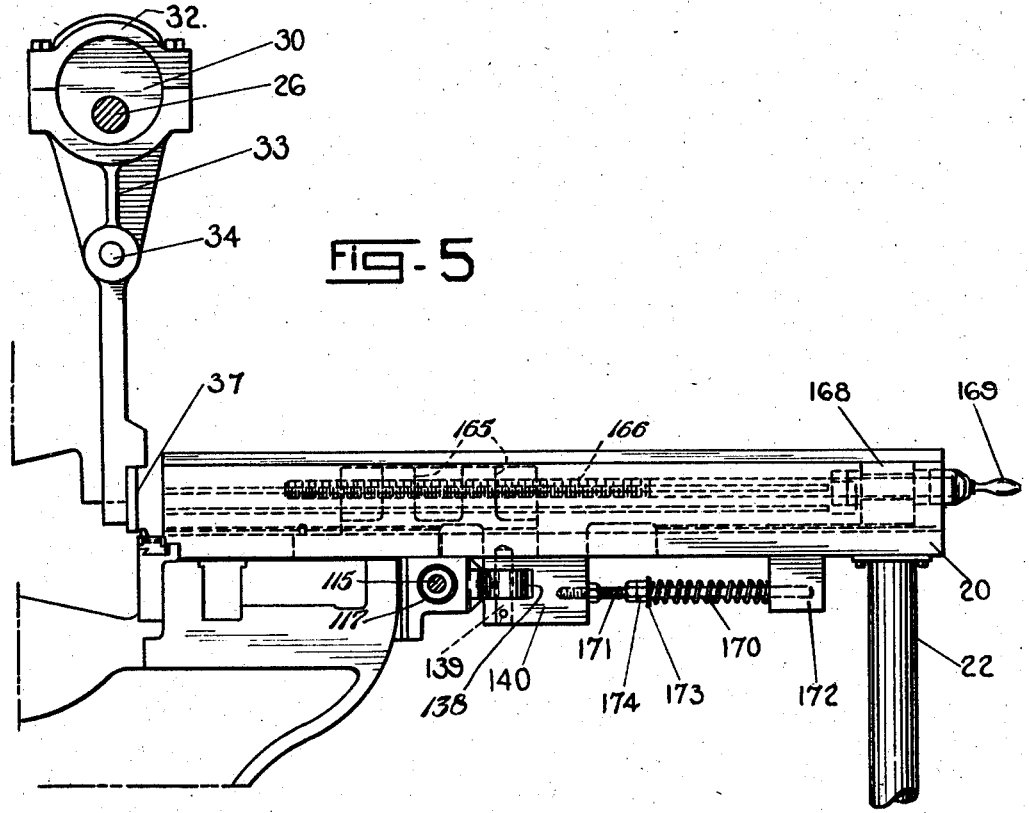
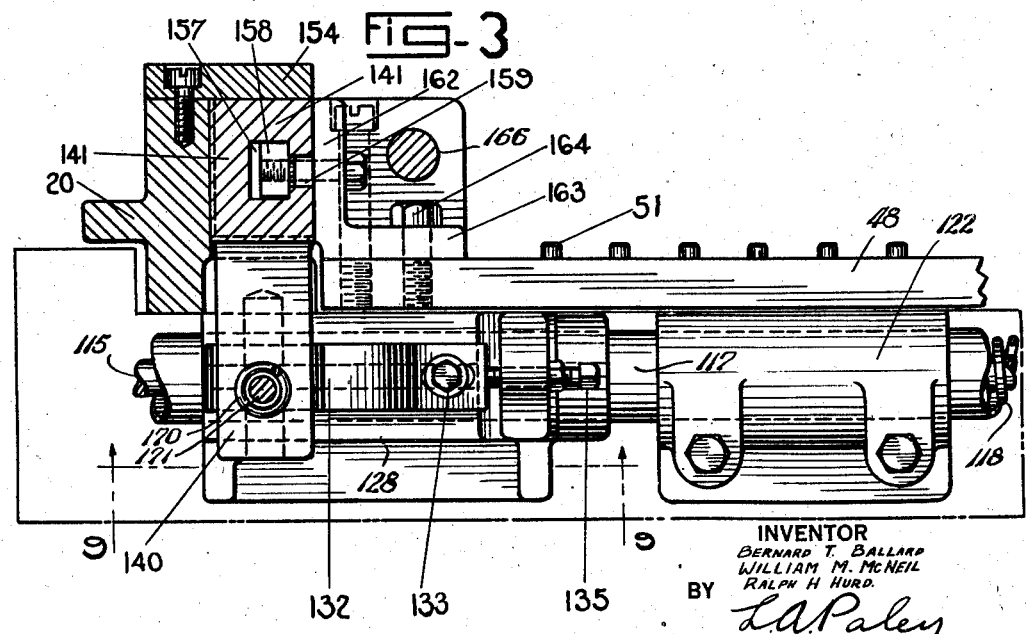

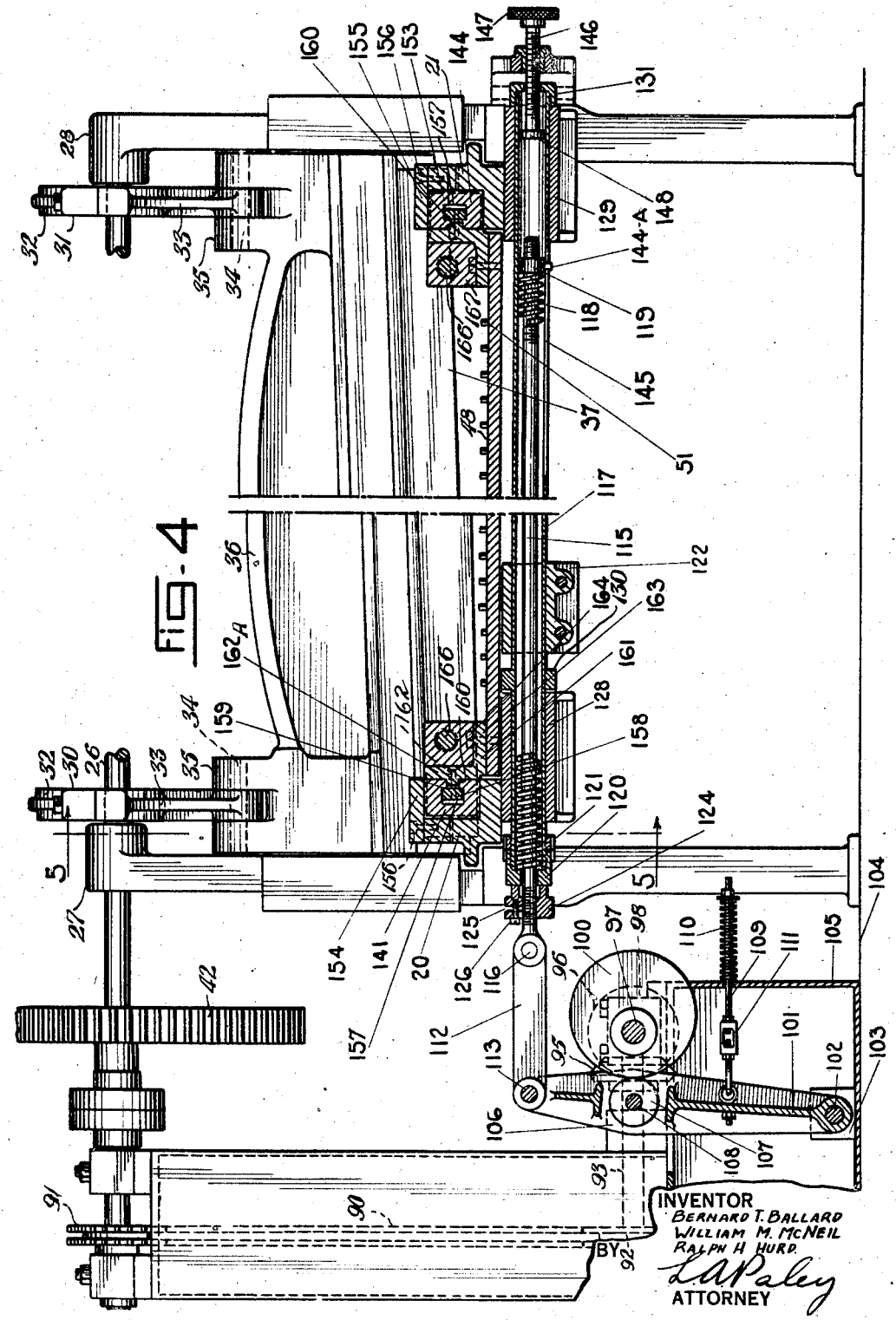

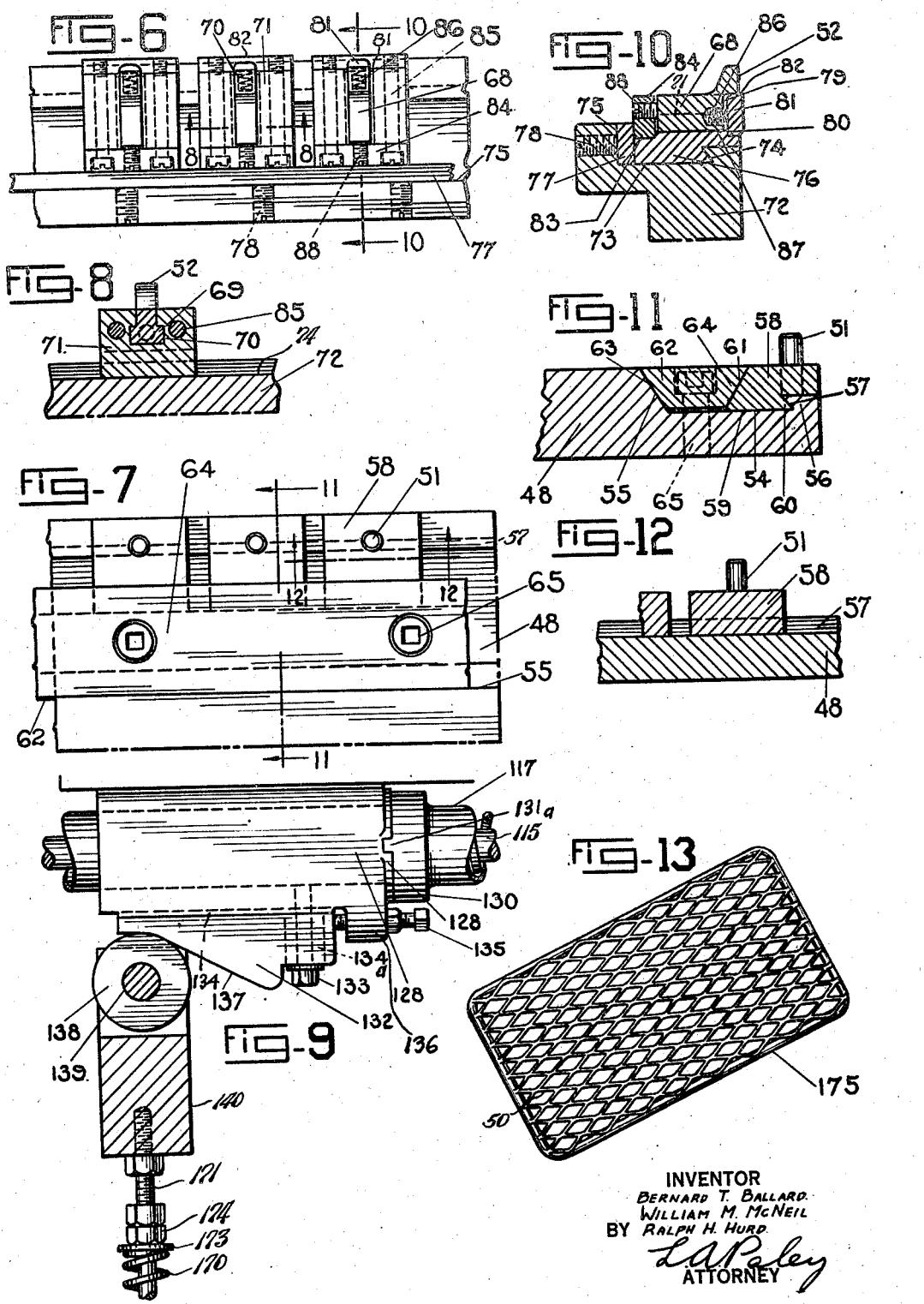

2,121,470

UNITED STATES PATENT OFFICE 2,121,470

MACHINE FOR MANUFACTURING SIZED SHEETS OF FLATTENED EXPANDED METAL

Bernard T. Ballard, Warren, Ohio, William M. McNeil, Wheaton, and Ralph H. Hurd, Hinsdale, Ill., assignors to United States Gypsum Company, Chicago, Ill., a corporation of Illinois Application September 24, 1936, Serial No. 102,320

21 Claims. (Cl. 164—34)

This invention relates to machines for the manufacture of sized sheets of flattened expanded metal.

Flattened expanded metal is commonly made by passing ordinary expanded metal through heavy rolls which tends to flatten the bonds and strands into the plane of the sheet. The flattened material is suitable for use as shelves for refrigerators, stoves, etc., when properly cut and stretched to size. The rolling and flattening operation, however, is apt to distort the diamonds of the expanded metal, causing the diamonds to be out of line. Furthermore, the rolled sheet is apt to be of a width or length different from that desired. If an attempt is made to shear this sheet to the desired dimensions the shear cut usually occurs at points other than through the center of the bonds, so that jagged points remain adjacent the shear cut which are a menace to the hands of the workmen handling the sheared sheets. It is desirable that the rolled sheets be of slightly smaller area than the metal peripheral frame which is to form the support for the shelf, and then the sheet is stretched slightly to bring it to the finally desired width or area.

An object of this invention, therefore, is to provide a machine for simultaneously sizing and shearing wide sheets of flattened expanded metal so that the finished sheets are exactly the desired width, and so that the shear cut extends directly through the center of the bonds, leaving no jagged points adjacent the shear cut.

Another object of the invention is to provide a machine in which provision is made for adjustment to accommodate expanded metal having different strand and bond widths, for sheets of flattened expanded metal having different widths, and also adjustment to permit slight contraction in the width of the sheet during the stretching or sizing operation; also to improve machines for the manufacture of flattened expanded metal in other respects hereinafter specified and claimed.

Figure 1:
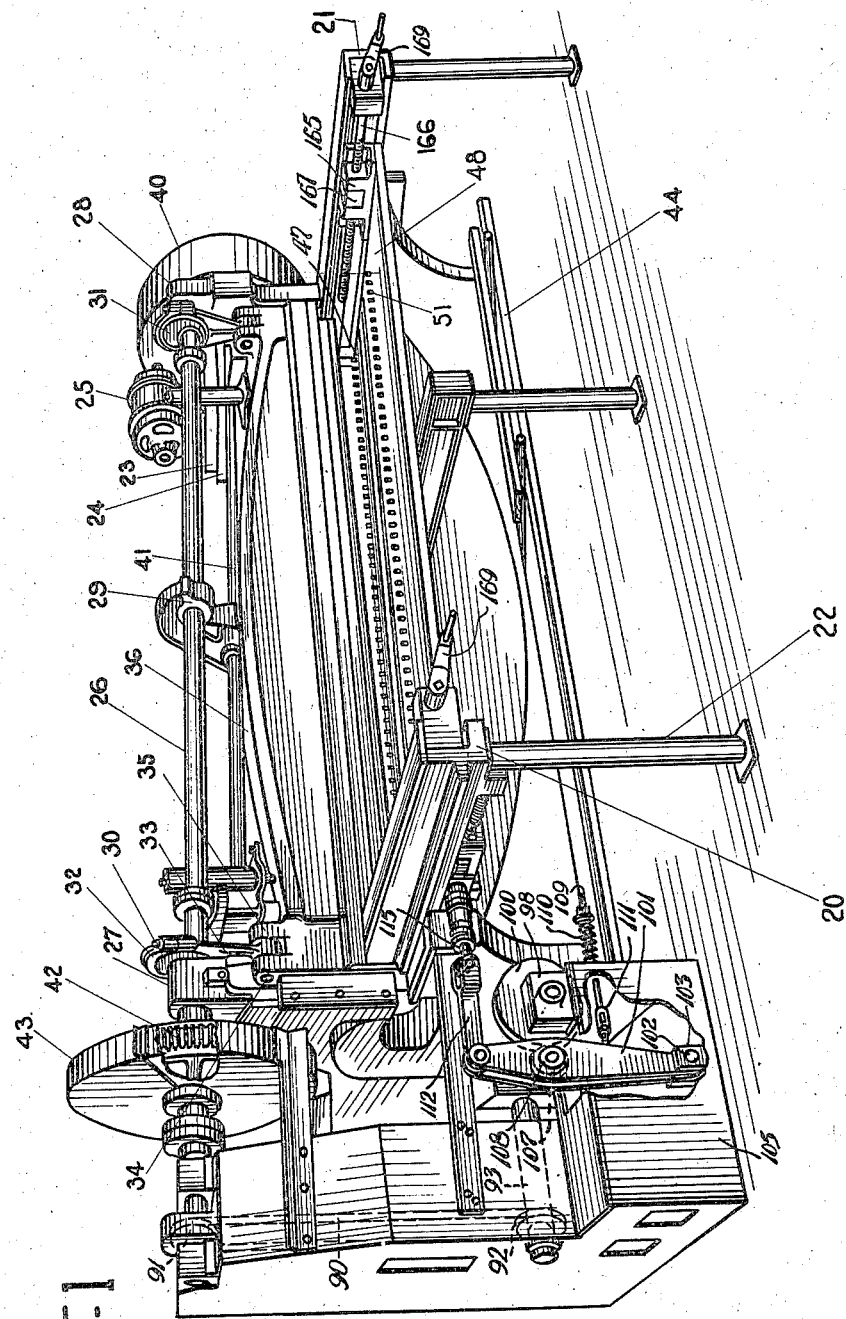
Figure 2:
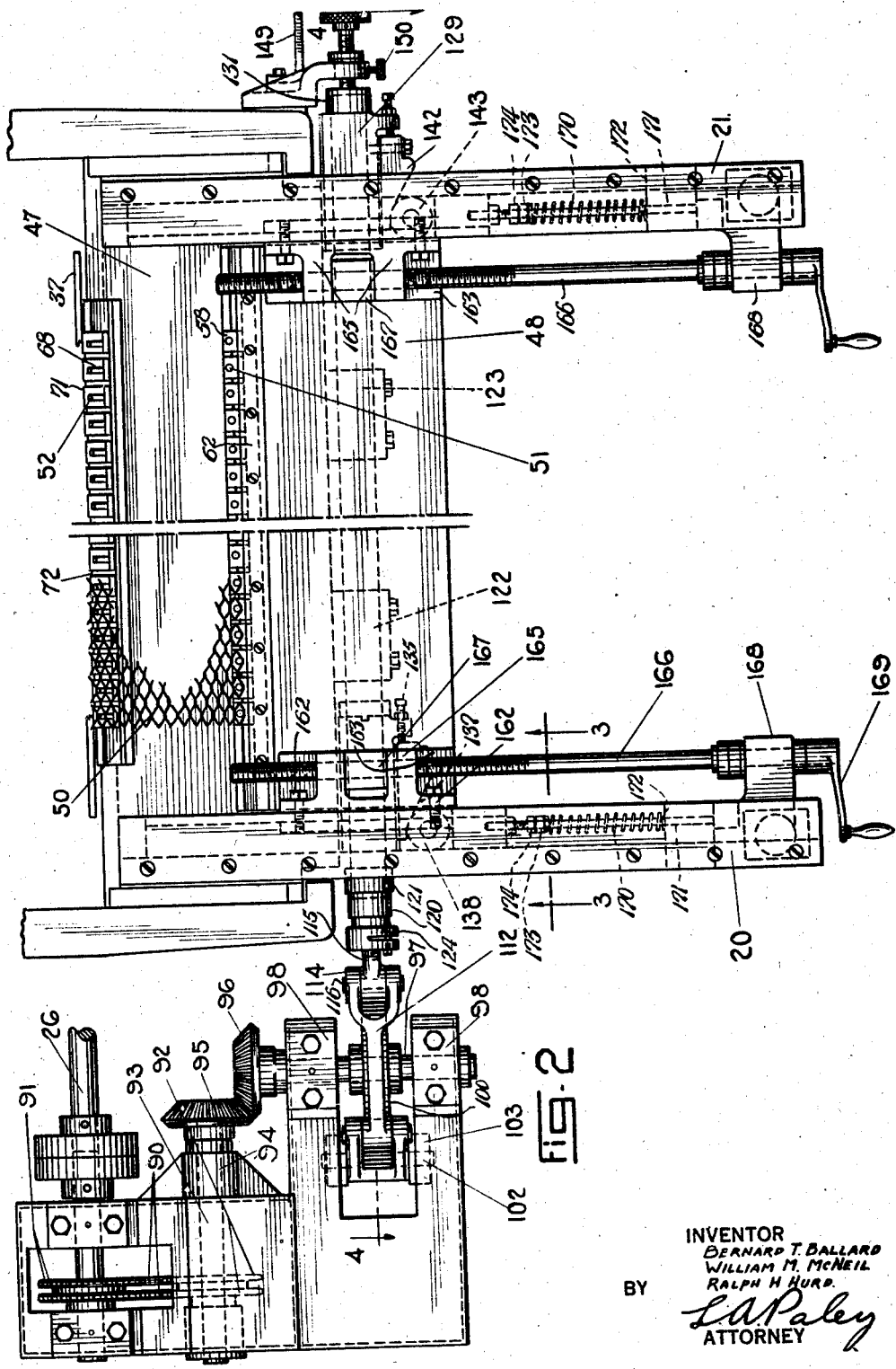

Reference is to be had to the accompanying drawings forming a part of this specification, in which Fig. 1 is a perspective view of our improved machine for simultaneously shearing and stretching flattened expanded metal, Fig. 2 is a plan view of the machine, Fig. 3 is a sectional elevation through the machine taken on line 3—3 of Fig. 2, Fig. 4 is a sectional elevation through the machine taken on line 4—4 of Fig. 2, Fig. 5 is a sectional elevation through the machine taken on line 5—5 of Fig. 4, Fig. 6 is a detail plan view of a portion of the machine showing the adjustable pins adjacent the shear plate, Fig. 7 is a detail plan view of the machine showing the movable pins for supporting the sheet of flattened expanded metal, Fig. 8 is a sectional elevation through the machine taken on line 8—8 of Fig. 6.

Fig. 9 is a sectional plan view through the machine taken on line 9—9 of Fig. 3, Fig. 10 is a sectional elevation through a portion of the machine taken on line 10—10 of Fig. 6, Fig. 11 is a sectional elevation through the machine taken on line 11—11 of Fig. 7, Fig. 12 is a sectional elevation taken on line 12—12 of Fig. 7, and Fig. 13 is a perspective view of a shelf made through the use of our improved machine.

Referring to the drawings by numerals, the machine comprises main horizontal frame members 20 and 21 which are supported upon suitable legs or standards 22. Upright frame members 23 and 24 serve to support an electric motor 25 or other suitable source of power, a horizontal shaft 26 being rotatably mounted in bearings 27 and 28 in the frame members 23 and 24, an intermediate bearing 29 being also provided for said shaft 26.

The shaft 26 is provided with a pair of eccentrics 30 and 31 adjacent the ends thereof, said eccentrics being connected by collars 32 and connecting rods 33 to pins 34 which are secured between upright ears 35 on a shear knife frame 36 to which is secured a shear knife 37. The shaft of motor 25 is provided with a pinion, not shown, within a gear housing 40, which meshes with a gear, also within the said housing, which is secured to a counter-shaft 41, the latter being rotatably mounted on the framework of the machine. The end of shaft 41 opposite the motor 25 is provided with a pinion, not shown, which meshes with a gear 42 mounted on shaft 26 within a gear case 43. When the motor 25 is started by the operator pressing on a foot treadle 44, shaft 26 is rotated through the speed reducing mechanism previously described, to cause the shear blade 37 to be lowered and shear off a sheet of metal which may extend between it and a special lower shear blade to be more fully described. It will be recognized that the mechanism so far described in detail, constitutes a standard power shear of a type well known to the art.

The salient feature of our invention consists in combining with the previously described power shear, mechanism and instrumentalities whereby simultaneous shearing and stretching of flattened expanded metal are accomplished. For this purpose, we provide a stationary table 47 adjacent the shear blade 37, which is preferably in the form of a flat slab of metal which has high rigidity in an edgewise direction. This table 47 is rigidly secured to the framework of the machine by suitable bolts. A second flat slab movable table 48 of high edgewise rigidity is slidably mounted on the framework of the machine in a manner to be hereinafter described. Sheets of flattened expanded metal 50 are usually formed by rolling ordinary expanded metal usually longitudinally of the diamonds between heavy rolls which serve to flatten down the bonds and strands from an inclined position into a common plane. We have found that sheets of flattened expanded metal 30 inches by 8 feet are convenient for handling by our improved machine, although sheets smaller than this can be utilized, or larger sheets may be used by providing tables 47 and 48 of sufficient length to accommodate the sheets.

The sheets of flattened expanded metal are inserted edgewise into the machine below the shear blade 37 from the far side of the machine as seen in Fig. 1 with the diamonds extending parallel with said blade. A series of pins 51 is provided on the movable table 48 for engaging in the diamonds at the entering edge of the sheet 50, and a series of pins 52 is supported on the fixed table 47 for engaging in a row of diamonds intermediate the edges of sheet 50. In order to support the pins 51, the inward edge of table 48 is provided with a longitudinal slot 54 (Fig. 11) bounded on one edge with an inclined wedge surface 55, and on the opposite edge by a longitudinal shoulder 56 having an inner inclined locking surface 57. Each of the pins 51 is rigidly secured to a block 58 whose lower surface 59 rests in the slot 54, being provided with an inclined locking shoulder 60 which seats against the shoulder 57. One edge of each of the blocks 58 is provided with an inclined wedge surface 61. A bar 62 extends longitudinally of the table 48 and inclined wedge surfaces 63 and 64 are formed on the edges of said bar 62 so as to force the block shoulders 60 firmly against the locking surfaces 57 by means of bolts 65 which extend through the bar 62 and are threaded into the table 48. The blocks 58 and pins 51 are thus locked in position longitudinally of the table 48 so that each pin 51 engages in a diamond of the flattened expanded metal. By loosening the bolts 65, the blocks 58 may be shifted longitudinally of the table 48 to suit expanded metal of various diamond lengths.

Each of the pins 52 is preferably formed on a slidable block 68 which is provided with outstanding shoulders 69 which slidably engage within a slot 70 formed in the upper surface of a block 71. An elongated bar 72 is L-shaped in cross section and is rigidly bolted to the forward edge of table 47 adjacent the shear knife 37. The upper surface of bar 72 is provided with a longitudinal slideway or slot 73 which terminates at one edge in an inclined locking shoulder 74, and at the other edge in a vertical shoulder 75. Each of the blocks 71 is provided with a tongue or shoulder 76 which is supported in the slot 73, said shoulder 76 having its forward edge inclined to engage the shoulder 74. A series of identical blocks 71 are thus supported in the slot 73 and a rectangular bar 77 extends along said bar 72 between the shoulder 75 and the blocks 71, said bar 77 being firmly pressed against said blocks 71 by screws 78 in the bar 72 so as to lock said blocks 71 in the desired adjusted position so that the pins 52 register exactly with the diamonds of the expanded metal being treated. Each of the blocks 68 and 71 is provided on its edge adjacent the shear knife 37 with slots 79 and 80 respectively which receive a shear knife 81 having a cutting edge 82. The opposite edge of each block 71 is provided with a slot 83 which receives a rectangular bar 84. A pair of long screws 85 extend through each block 71 and serve to securely attach together the bar 84, block 71 and shear knife 81 as a unit. The block 68 is somewhat shorter than the distance between shear knife 81 and bar 84, and is provided in the slot 77 with a spring recess 86 for receiving a compression spring 87 which normally tends to slide the block 68 rearwardly toward the bar 84, the rearward movement of said block being limited by an adjusting screw 88. Thus by adjusting the screw 88, the distance between the cutting edge 82 and the flattened face of pin 52 can be varied slightly to accommodate expanded metal of different bond widths, so that the bond is severed exactly through its center to leave no jagged edges which might injure a workman.

In order to manipulate the sliding table 48 to accomplish the stretching of the flattened expanded metal simultaneously with the shearing of the bonds by the shear knife 37, we provide a mechanism to be hereinafter described, which is driven by tandem chains 90 connecting sprocket wheels 91 secured to shaft 26, with sprocket wheels 92 secured to a counter shaft 93. The shaft 93 is rotatably mounted in suitable bearings 94 on the framework of the machine, and a bevel gear 95 is secured to one end of said shaft and meshes with a bevel gear 96 secured to a cam shaft 97, the latter being rotatably mounted in bearings 98 supported on the framework of the machine. A cam 100 is secured to the shaft 97 between the bearings 98. A rock lever 101 is pivotally mounted at its lower end, on a pin 102 which is secured in a bearing 103, the latter being secured to the floor 104 within a housing 105. The lever 101 has a bifurcated center section 106, and a roller 107 is rotatably mounted on a pin 108 between the legs of said section 106 so as to contact with the cam 100. A rod 109 is pivotally connected near the center of lever 101 and extends through the housing 105 to receive a compression spring 110 which serves to maintain the roller 107 in firm contact with the cam 100, a turnbuckle 111 being provided on said rod 109 for adjustment purposes.

The upper end of lever 101 is pivotally connected to a connecting link 112 by means of a pin 113 at one end of said link. The other end of said link is formed into a bifurcated section 114 to which the end of a spring rod 115 is pivotally connected by means of a pin 116. The rod 115 extends into a spring tube or cylinder 117 and a long compression spring 118 extends around said rod within the tube 117. The spring 118 is confined between a collar 119 threaded onto the end of rod 115, and an annular cap 120 threaded onto the end of the cylinder 117, the latter being provided with a lock nut 121. The cylinder 117 is slidably mounted for axial movement in a pair of bearings 122 and 123 which are rigidly secured to the framework of the machine. The spring 118 normally urges the cylinder 117 to the left as seen in Fig. 4, the axial movement of said cylinder 117 being limited by a collar 124 which is threaded onto the rod 115 adjacent the pin 116, said collar being partially divided into two sections by a slot 125 connected by a locking screw 126 adapted to lock said collar against rotation from an adjusted position.

In order to cause the stretching of the flattened expanded metal at the time a strip is sheared off, a pair of collars 128 and 129 are rigidly secured to the tube 117. An annular flange 130 is secured to the tube 117 to prevent axial movement of the collar 128, a key 131a on said flange 130 engaging in a registering keyway in the collar 128 to prevent said collar from rotating on said tube 117. A cap 131 is threaded onto the end of tube 117 to prevent axial movement of the collar 129. A cam 132 is secured to the collar 128 by means of a bolt 133, and a key 134 on said cam 132 engages in a longitudinal keyway in the collar 128. The bolt 133 passes through a slot 134 in the cam 132 so that when the bolt 133 is loosened, said cam may be adjusted axially of the tube 117 to any desired adjusted position, by means of an adjusting bolt 135 which passes through a lug 136 on the collar 128 to engage said cam 132. An inclined cam surface 137 is formed on the cam 132 which engages a roller 138 the latter being rotatably mounted on a pin 139 secured to a downstanding shoulder 140 formed on a slide bar 141. A similar cam 142 is secured to the collar 129 to engage a roller 143 which is rotatably mounted on a slide bar 144. As the rod 115 is moved axially to the left as seen in Fig. 4, under the action of cam 100, the collar 119 compresses the spring 118 which also moves the tube 117 to the left so that cams 132 and 142 act on the rollers 138 and 143 to pull the bars 141 and 144 longitudinally to accomplish the stretching of the flattened expanded metal in a manner to be more fully described. A pin 144A extends radially from the collar 119 and operates in a slot 145 in the tube 117 to prevent the collar 119 from rotating and changing its position on the rod 115 and thus change the compression of spring 118 when once adjusted. The movement of the tube 117 to the left, is limited by an adjusting screw 146 having a head 147 at its outer end. The screw 146 passes through an opening in the cap 131 and an annular collar 148 on its inner end to contact with the cap 131 and limit the movement of the tube 117 to the left so that the cams 132 and 142 accomplish exactly the desired stretching of the expanded metal. A graduated indicator 149 extends from the frame of the machine adjacent the adjusting head 147 so that said screw 146 can be set to any desired position, and a set screw 150 engages said screw 146 to set it in said adjusted position.

The bars 141 and 144 are slidably mounted for longitudinal movement in the L-shaped slide frame members 20 and 21 respectively. Plates 154 and 155 are secured to the frame members 20 and 21, by screws 156 so as to confine the bars 141 in frame members 20 and 21 with a sliding fit. Each of the bars 141 and 144 is provided with an internal longitudinal slot 157 which is shaped to receive an elongated clamping bar 158. Each of the slots 157 opens at the inside of the bars 141 and 144, in a narrow slot 159 into which extends an elongated integral key 160 formed on an L-shaped bracket 161. A plurality of bolts 162 extend through a leg 162A of bracket 161, through the key 160, and are threaded into the clamping bar 158 so as to adjustably clamp the brackets 161 onto the bars 141 and 144. A horizontal leg 163 is formed on each bracket 161, and is secured by bolts 164 to the table 48, so as to rigidly support said table. A pair of spaced flanges 165 connects the legs 162 and 163 of each bracket 161, and a threaded rod 166 passes loosely through said flanges, being threaded into a nut 167 which is received between each pair of said flanges 165. The outer end of each of said rods 166 passes through a flange 168 formed on the outer end of each bar 141 and 144, being provided with an adjusting crank 169 for changing the position of table 48 relative to the bars 141 and 144 to produce different widths of sheets. It will be seen that the table 48, rods 166 and bars 141 and 144 reciprocate back and forth as a unit under the impulse of cam 100 which rotates intermittently when the operator presses foot treadle 44. In order to return the table 48 to its inner position after a stretching operation, we provide a pair of compression springs 170, each of which is coiled about a rod 171 having one end screwed into the shoulder 140, and the other end slidably received in a hole in a shoulder 172 formed on each of the frame members 20. The springs 170 are confined between a washer 173 and retaining nuts 174 on rod 171, and the shoulder 172.

The sheets of flattened expanded metal are sheared off to the desired width with the shear cut extending exactly through the center of the bonds leaving no sharp points or edges, as stretching to the desired size takes place simultaneously with the shearing operation. The resulting strip of expanded metal is cross-sheared to the desired length to produce a shelf having a peripheral frame bar 175 to which the sized sheet of flattened expanded metal of exactly the right size is electro-welded or otherwise secured.

In operation, the strip of flattened expanded metal 50 is introduced crosswise between the shear blade 37 and a series of individual shear blades 81. The sheet is deposited within the diamonds along the leading edge of the sheet engaging the series of pins 51, and a row of diamonds intermediate the edges of the sheet 50 engaging the series of pins 52. The operator then actuates the foot treadle 44 which starts the motor 25 and rotates shafts 41 and 26. The eccentrics 30 and 31 then act through connecting rods 33 to lower shear blade 37 adjacent shear blades 81 so as to cut off a strip of flattened expanded metal exactly through the centers of the bonds. As the shear blade 37 is lowered, counter shaft 93 is rotated by chains 90 to rotate cam shaft 97 through bevel gears 95 and 96. Cam 100 on shaft 97 then acts on roller 107 to rock lever 101 and move rod 115 axially to the left (Fig. 4) through link 112. The spring 118 is compressed by collar 119 by the movement of rod 115, which causes tube 117 to also move to the left in slide bearings 122 and 123 until the inside of cap 113 contacts with the stop shoulder 148 on adjustable rod 146. The rod 115, however, continues to move to the left until the cam 100 makes half a revolution, after which the rod 115 moves to the right during the remainder of the revolution of the cam 100. As the tube 117 moves to the left, it carries with it cams 132 and 142 which act on rollers 138 and 143 to move slide bars 141 and 144 outwardly away from shear blade 37. The outward movement of cams 132 and 142 also carries the table 48 outwardly which causes the pins 51 to stretch the flattened expanded metal the desired degree as it is sheared. In order to adjust the table 48 along the slide bars 141 and 144 to accommodate expanded metal strips of different widths, bolts 162 are loosened and cranks 169 on rods 166 rotated the desired amount, after which bolts 162 are again tightened to lock the table 48 to slide bars 141 and 144. Pins 52 are adjustable relative to the shear blades 81 for different bond widths, by rotating adjusting screws 88, and are adjustable longitudinally of the bar 72 for different diamond lengths, by loosening set screws 78. Pins 51 are adjustable longitudinally of the table 48 by loosening set screws 65.

It should be understood that the stretching function of the machine may be utilized without utilizing the shearing function. In other words, sheets of flattened expanded metal may be sized or stretched on the machine without shearing.

We would state in conclusion that, while the illustrated example constitutes a practical embodiment of our invention, we do not wish to limit ourselves precisely to these details, since manifestly the same may be considerably varied without departing from the spirit of the invention as defined in the appended claims.

Having thus described our invention, we claim as new and desire to secure by Letters Patent:—

1. In a machine for shearing and stretching flattened expanded metal, a series of fixed pins positioned adjacent cooperating shear blades, a series of movable pins in spaced, parallel relation to said fixed pins, and means for increasing the distance between said fixed and movable pins so as to stretch expanded metal on said pins as said expanded metal is sheared along one edge by said shear blades.

2. In a machine for shearing and stretching flattened expanded metal, a series of fixed pins positioned adjacent cooperating shear blades, a series of movable pins in spaced, parallel relation to said fixed pins, and means for moving said movable pins away from said fixed pins a predetermined distance so as to stretch expanded metal supported by said pins as said expanded metal is sheared along one edge by said shear blades.

3. In a machine for shearing and stretching flattened expanded metal, a series of fixed pins positioned adjacent cooperating shear blades, a series of movable pins in spaced parallel relation to said fixed pins, slide members for slidably supporting said movable pins, and means for varying the distance between said fixed pins and said movable pins and slide members.

4. In a machine for shearing and stretching flattened expanded metal, a series of fixed pins positioned adjacent cooperating shear blades, a series of movable pins in spaced, parallel relation to said fixed pins, slide members for slidably supporting said movable pins, and a cam for moving said slide members and movable pins away from said fixed pins so as to stretch to a predetermined degree flattened expanded metal supported on said fixed and movable pins.

5. In a machine for shearing and stretching flattened expanded metal, a series of fixed pins positioned adjacent cooperating shear blades, a series of movable pins in spaced, parallel relation to said fixed pins, slide members for slidably supporting said movable pins, a tube having cam means for moving said slide members and movable pins upon axial movement of said tube, and means for moving said tube axially.

6. In a machine for shearing and stretching flattened expanded metal, means for engaging an edge of a sheet of said expanded metal, means for engaging said sheet intermediate the edges thereof, cooperating shear blades adjacent said intermediate engaging means, means for separating said engaging means to stretch said sheet, and simultaneously shearing off a section of said sheet as said sheet is stretched.

7. In a machine for shearing and stretching flattened expanded metal, a series of fixed pins positioned adjacent cooperating shear blades, a series of movable pins in spaced, parallel relation to said fixed pins, slide members for slidably supporting said movable pins, a tube having cam means for moving said slide members and movable pins upon axial movement of said tube, a compression spring, a rod within said tube for supporting said spring in compression, means for moving said rod axially of said tube so as to increase the compression of said spring and cause the axial movement of said tube and cam means so as to separate said fixed and movable pins to accomplish the stretching of said metal as said metal is sheared.

8. A machine as described in claim 7 characterized by means for adjustably limiting the axial movement of said tube and cams, and thus regulate the amount of stretching applied to said expanded metal.

9. A machine as described in claim 7 characterized by a rotatable cam adapted to act on said rod and cause the axial movement of said tube.

10. A machine as described in claim 7 characterized by means for adjusting the position of said movable pins relative to said slide members so as to produce sheared sheets of expanded metal of varying width.

11. In a machine for shearing and stretching flattened expanded metal, means for engaging an edge of a sheet of said expanded metal, means for engaging said sheet intermediate the edges thereof, cooperating shear blades adjacent said intermediate engaging means, a rotatable shaft adapted to cause said shear blades to shear off a strip of said sheet of flattened expanded metal, a rotatable cam adapted to be driven from said shaft, and means associated with said shaft for causing said sheet engaging means to separate and stretch said sheet as said sheet is sheared.

12. In a machine for shearing and stretching flattened expanded metal, means for engaging an edge of a sheet of said expanded metal, means for engaging said sheet intermediate the edges thereof, cooperating shear blades adjacent said intermediate engaging means, slide members supporting said edge engaging means, cam means adapted to move said edge engaging means away from said intermediate means as said sheet is sheared so as to accomplish simultaneous shearing and stretching of said sheet, and spring means for returning said slide members to normal position after said shearing and stretching operations.

13. In a machine for shearing and stretching flattened expanded metal, a series of fixed pins positioned adjacent cooperating shear blades, a series of movable pins in spaced, parallel relation to said fixed pins, means for varying the distance between said two series of pins to accomplish stretching of a sheet of flattened expanded metal, and means for varying the distance between individual pins of each series to accommodate expanded metal of different diamond lengths.

14. In a machine for shearing and stretching flattened expanded metal, a series of fixed pins, a series of movable pins in spaced, parallel relation to said fixed pins, a fixed shear blade adjacent each fixed pin, a reciprocating shear blade adjacent said series of fixed pins and shear blades, means for varying the distance between each fixed pin and each fixed shear blade so as to accommodate expanded metal of different bond width, and means for varying the distance between said fixed and movable pins to accomplish the stretching of said sheet of metal.

15. In a machine for shearing and stretching flattened expanded metal, a series of fixed pins positioned adjacent cooperating shear blades, a series of movable pins in spaced, parallel relation to said fixed pins, slide members for slidably supporting said movable pins, cam means for causing the movement of said slide members, and means for adjusting said cam means relative to said slide members so as to vary the movement of said slide members under the action of said cam means.

16. In a machine for stretching flattened expanded metal, a series of fixed pins, a series of movable pins in spaced, parallel relation to said fixed pins, slide members for slidably supporting said movable pins, cam means mounted for substantially rectilinear movement, means on said slide members positioned for engagement by said cam means, and means for operating said cam means to move said slide members and movable pins away from said fixed pins so as to stretch to a predetermined degree flattened expanded metal supported on said fixed and movable pins.

17. In a machine for stretching flattened expanded metal, a series of fixed pins, a series of movable pins in spaced, parallel relation to said fixed pins, slide members for slidably supporting said movable pins, a tube having cam means for moving said slide members and movable pins upon axial movement of said tube, and means for moving said tube axially.

18. In a machine for stretching flattened expanded metal, a series of fixed pins, a series of movable pins in spaced, parallel relation to said fixed pins, slide members for slidably supporting said movable pins, a tube having cam means for moving said slide members and movable pins upon axial movement of said tube, a compression spring, a rod within said tube for supporting said spring in compression, means for moving said rod axially of said tube so as to increase the compression of said spring and cause the axial movement of said tube and cam means so as to separate said fixed and movable pins to accomplish the stretching of said expanded metal.

19. A machine as described in claim 18 characterized by means for adjustably limiting the axial movement of said tube and cams, and thus regulate the amount of stretching applied to said expanded metal.

20. A machine as described in claim 18 characterized by a rotatable cam adapted to act on said rod and cause the axial movement of said tube.

21. In a machine for stretching flattened expanded metal, a series of fixed pins, a series of movable pins in spaced, parallel relation to said fixed pins, slide members for slidably supporting said movable pins, cam means for causing the movement of said slide members, and means for adjusting said cam means relative to said slide members so as to vary the movement of said slide members under the action of said cam means.

BERNARD T. BALLARD.
WILLIAM M. McNEIL.
RALPH H. HURD.